UNITED STATES PATENT OFFICE.

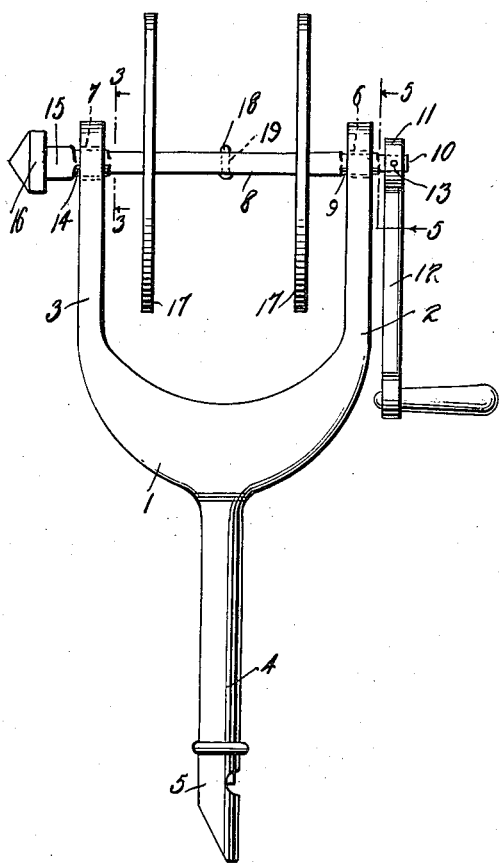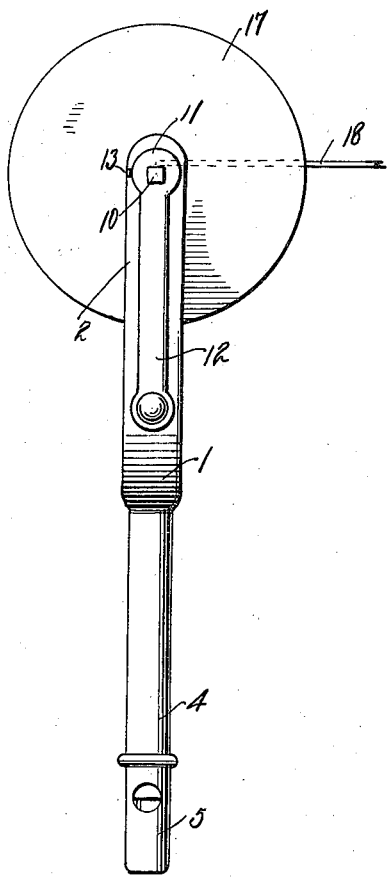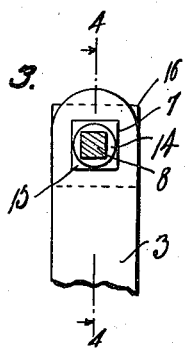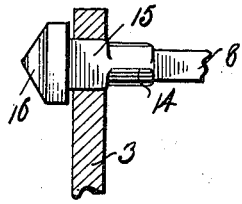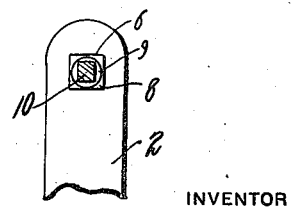

JOHN J. CRAIG, OF CARNEGIE, PENNSYLVANIA.

KITE-STRING HOLDER.

1,296,268. Specification of Letters Patent. Patented Mar. 4, 1919.

Application filed May 28, 1918. Serial No. 237,071.

*To all whom it may concern:*

Be it known that I, JOHN J. CRAIG, a citizen of the United States, residing at Carnegie, in the county of Allegheny and State of Pennsylvania, have invented certain new and useful Improvements in Kite-String Holders, of which the following is a specification.

This invention relates to reels, and more particularly to a reel especially adapted for use for holding a kite line, or a line which is attached to a freely movable object.

One of the main objects of the invention is to provide a reel of simple construction and operation which is capable of having a relatively large amount of line or string wound thereon.

A further object is to provide a reel in which the winding shaft may be optionally permitted to rotate freely, means also being provided for securing this shaft against rotation.

A still further object is to provide a reel, the various parts of which are so related as to permit ready assembling or disassembling thereof. Further objects will appear from the detailed description.

In the drawings:—

Figure 1, is a front view of a reel constructed in accordance with my invention showing the shaft in position so as to permit free rotation thereof.

Fig. 2, is a side view.

Fig. 3, is a section taken substantially on line 3—3 of Fig. 1.

Fig. 4, is a section taken on line 4—4 of Fig. 3.

Fig. 5, is a section taken on line 5—5 of Fig. 1.

The supporting frame of the reel comprises a fork 1 having the upwardly projecting parallel arms 2 and 3 and provided with the depending stem or handle 4, the lower end portion of which may be cut to provide a whistle 5. Arm 2 is provided adjacent its upper end, with a square aperture 6 which is in alinement with a similar aperture 7 provided in arm 3, the aperture 7 being somewhat greater in size than the aperture 6. These arms act to support a winding drum or shaft 8. The body portion of this shaft is of square or polygonal short section, and the shaft is provided adjacent one end of the body portion thereof with a reduced cylindrical portion 9 which is adapted to rest in the opening 6 of arm 2 so as to be freely rotatable therein, the end portion of the shaft 10 being squared to fit into the eye 11 of the operating crank 12 which is secured in position on the shaft by set screw 13. The shaft is further provided, adjacent the other end of the body thereof, with an enlarged cylindrical portion 14 which is adapted to extend through the opening 7 of arm 3 so as to rotatably support the shaft, and with an enlarged squared portion 15 provided at its outer end with an enlarged head 16.

Retaining disks 17 are secured on the body portion of the shaft adjacent each end thereof, between the arms 2 and 3. These disks serve to retain a line 18 which may be wound upon the shaft between the disks, the shaft being provided at its longitudinal center with a bore 19 through which the end portion of the line is secured so as to effectually prevent slipping of the line on the shaft.

When it is desired to permit free rotation of the reel so as to unwind the line, shaft 8 is moved longitudinally through the arms 2 and 3 so as to bring the cylindrical portions 9 and 14 thereof into the openings 6 and 7, respectively. When this is done, the shaft is mounted for free rotation in the arms so as to permit easy unwinding of the line, as will be evident. Also, with the shaft in this position the line may be readily wound up by turning the shaft in the proper direction by means of crank 12. When it is desired to prevent unwinding of the line, this is readily accomplished by moving the shaft longitudinally in the opposite direction so as to bring the squared member 15 and the squared body portion of the shaft into engagement with the openings 7 and 6 respectively; the shaft may be positively locked against rotation. The movement of the shaft through arms 2 and 3 in the direction of the crank 12 is positively limited by the head 16 which acts to effectually prevent the withdrawal of the shaft in this direction and insure proper operation of the locking means, the crank 12 acting to prevent complete withdrawal of the shaft in the opposite direction. When the shaft is supported so as to be freely rotatable, as in Fig. 1, the shoulders which are formed at the end portions of the square member 15, and the square body portion of the shaft adjacent the arms 2 and 3 serve to prevent movement of the shaft longitudinally into such position as to be locked against rotation. The disks 17 are preferably secured on the squared portion of shaft 8 frictionally so that, by removing the crank 12 and detaching the line 18 from the shaft, this shaft may be readily demounted, thus permitting the reel to be disassembled for packing for shipment, repairs, or other purposes.

The foregoing description and the drawings have reference to what may be considered the preferred or approved form of invention. It is to be understood that I may make such changes in construction and arrangement and combination of parts, materials, dimensions, etc., as may prove expedient and fall within the scope of the appended claims.

Having thus described my invention what I claim as new and desire to secure by Letters Patent is:—

1. A reel comprising a supporting frame having spaced supporting arms each provided with square openings, one being larger than the other, a shaft having a square body portion of a length equal to the distance between the said supporting arms said shaft having a cylindrical portion at each end of the said square body portion, the said cylindrical portions being adapted for reception in the said openings in the supporting arm, the smaller of the said square openings being also adapted to receive one end of the said square body portion, the outer end of the cylindrical portion at the opposite end of the shaft being provided with an enlarged square portion of a size equal to the square opening in the adjacent supporting arm, the opposite terminal of the shaft being further reduced and provided with a removable crank element and disks having square openings adapted to be placed on the shaft over the small end thereof and received on the square body portion.

2. In a reel, a supporting frame, said frame being provided with upwardly projecting spaced supporting arms, each having a polygonal opening, a shaft mounted in said arms provided with cylindrical portions and polygonal portions adjacent thereto, the shaft being movable longitudinally to the supporting arm and provided at one end with an enlarged head, the cylindrical portions of the shaft being adapted to rest in the opening of the arms so as to rotatably support said shaft and the polygonal portions being adapted to fit snugly into said openings so as to lock the shaft against rotation when the shaft is moved longitudinally in one direction, and a winding crank secured on the other end of the shaft and cooperating with said head to normally prevent complete withdrawal of the shaft from said supporting arms.

In testimony whereof I affix my signature in presence of two witnesses.

JOHN J. CRAIG.

Witnesses:
   IRWIN C. GRABILL,
   O. S. COLE.